Dec. 24, 1968  E. S. PERRY ET AL  3,418,158
CHROMATOGRAPHIC SHEETS
Filed April 23, 1965
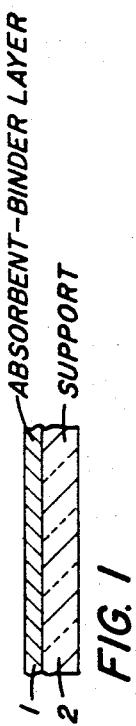
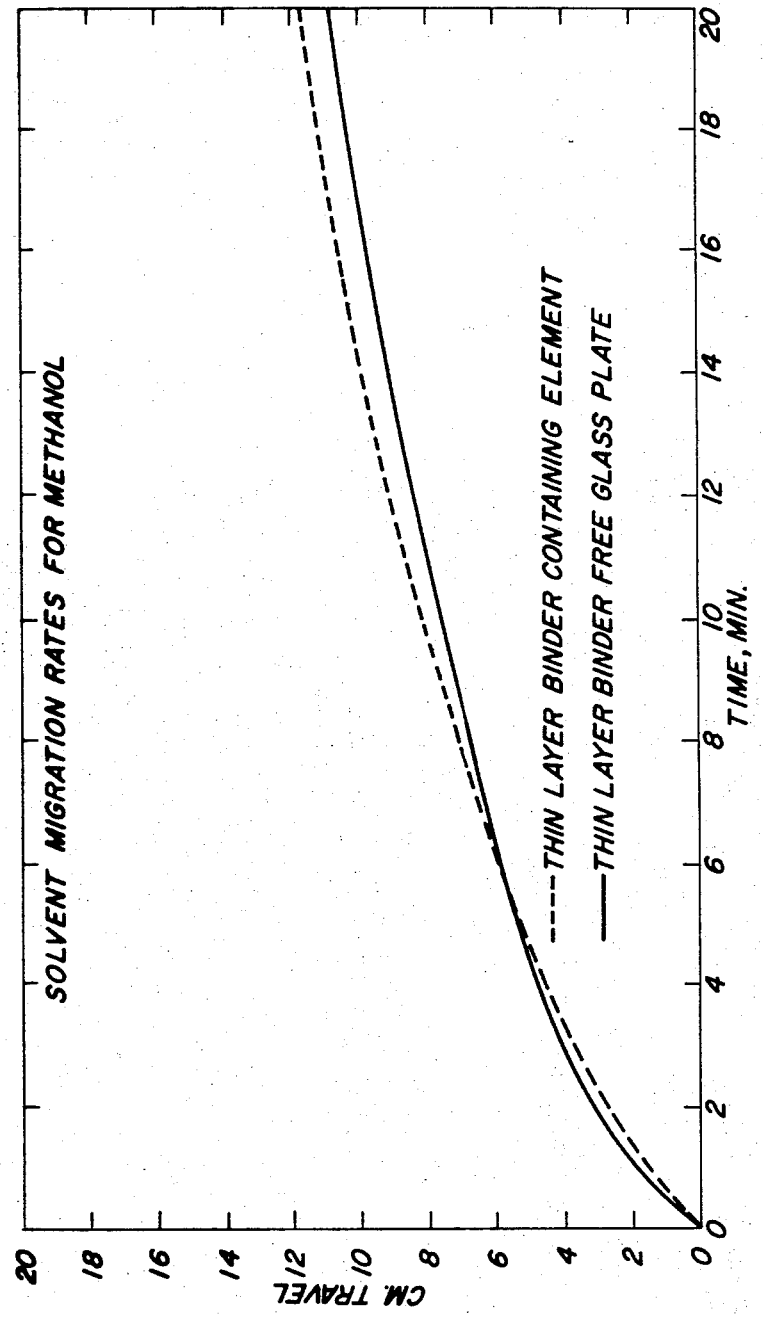
EDMOND S. PERRY
WILLIAM J. STAUDENMAYER
INVENTORS
ATTORNEYS

United States Patent Office 3,418,158
Patented Dec. 24, 1968

3,418,158
CHROMATOGRAPHIC SHEETS
Edmond S. Perry and William J. Staudenmayer, Rochester, N.Y., assignors to Eastman Kodak Company, Rochester, N.Y., a corporation of New Jersey
Filed Apr. 23, 1965, Ser. No. 450,362
13 Claims. (Cl. 117—132)

ABSTRACT OF THE DISCLOSURE

A thin-layer chromatographic element comprised of a coherent chromatographically-active layer, containing a chromatographically-active adsorbent and a polymeric binder, firmly adhered to a flexible inert support.

---

This invention relates to chromatographic sheets. More particularly, the invention relates to coherent thin-layer chromatographic sheets wherein a thin-layer is firmly bonded to an inert support.

Thin-layer chromatography is a technique which has attracted much attention in separatory chemistry. It is a widely popular technique which has undergone rapid growth. Among the advantages of thin-layer chromatography are simplicity, rapid development, and selectivity for a great variety of separations. The large number of adsorbents available and ease of changing other components such as fluorescing or complexing agents or elutant solvents present a number of parameters which may be varied to obtain a given separation. In general, thin-layer chromatography is a technique which displays numerous advantages and fully warrants the acceptance and rapid growth as experienced.

One significant detriment curtails an even more widespread acceptance of the technique of thin-layer chromatography. The currently available chromatographic elements comprise a glass plate having thereon a thin-layer adsorbent. According to conventional practice, the user must coat and otherwise prepare the plates. This involves the purchase and storage of adsorbents, glass plates and a coating apparatus. The adsorbent must be mixed with water or other liquid in proper proportions, coated on a glass plate and dried before use. Even after preparation, binder-free glass plate chromatographic elements require careful handling because of the tendency of the adsorbent to fall off as a powder. Also, the size and weight of glass plates make them inconvenient to handle, impractical to store and unsuitable for record purposes.

Precoated glass plate thin-layer chromatographic elements are available. However, though these precoated plates avoid the inconvenience of preparation by the user, they are fragile and subject to damage during transport. The precoated glass plates are also inconvenient to store and unsuitable for record purposes because of their frail nature.

It is an object of the present invention to provide a thin-layer chromatographic sheet which is capable of shipment and handling without damage.

It is another object of this invention to provide a thin-layer chromatographic sheet which can be prepared under exacting uniform and reproducible conditions by a manufacturer and supplied undamaged in convenient form to the user.

It is a further object of this invention to provide a thin-layer chromatographic sheet which displays the handling ease of a paper chromatographic element and the separation quality of a thin-layer chromatographic element.

A still further object of this invention is to provide a thin-layer chromatographic sheet which is suitable and convenient for permanent storage as records.

Other objects of this invention will be apparent from the drawing and following detailed disclosure.

The above objects are accomplished according to this invention by preparing a chromatographically active thin-layer coating comprising a conventional chromatographically active adsorbent and a polymeric binder. It is indeed surprising that adsorbents can be combined with polymeric binders without substantially poisoning the chromatographically active adsorption sites of the adsorbents. The polymeric binder permits strong, coherent thin-layer coatings which display chromatographic activity substantially the same as the fragile prior art binder-free coatings. Since the coating of this invention is coherent and abrasion resistant, it is not necessary to use the bulky and inconvenient glass plates which are conventionally employed to provide strength and protection for the fragile binder-free chromatographic coatings. It is only necessary to provide a flexible, inert support for the strong, coherent polymeric binder-containing adsorbent coatings of this invention. It will be readily recognized that even glass plate chromatographic elements will be greatly improved by use of the coating of this invention.

Thin-layer chromatography is a separation technique having widespread utility with numerous unknowns and solvents. It is necessary to choose a polymeric binder which is inert to the unknowns and insoluble in the elutant solvents. Of course, no single binder displays these properties relative to all unknowns and elutants. Since organic solvents are most widely used in thin-layer chromatography, illustration of this invention will be primarily concerned with binders which function in the desired manner with the more popular solvents. However, it is to be understood that this invention is equally applicable to unusual solvent systems including aqueous elutants. The great number of solvents available preclude the specific discussion of each type.

Similarily, the support must be inert to the elutant used and to the chromatographic activity of the adsorbent layer. One skilled in the art would have no difficulty in choosing a proper support and binder in view of this disclosure. Inert and dimensionally stable polyesters such as polyethylene terephthalate are preferred supports. Vinyl films, polyolefin films, cellulose films and polyamide films are examples of workable supports. Metal foils, such as aluminium foil, are also suitable. Since the support is a passive aspect of this invention in that it need only be inert, and in view of the well-known physical and chemical properties of numerous flexible films, one skilled in the art will be able to specify a suitable flexible support for a given application. As stated above, glass plates and other inflexible supports are operable if bulk is not objectionable.

Adsorbents suitable for use in this invention are conventional adsorbents which include alumina, silica gels, kieselguhr, polyamide powders and cellulose. Additives such as phosphor or fluorescing compounds which have been employed in previously-known glass plate thin-layer chromatographic elements are as fully operable in this invention and may be included as needed and/or desired.

Illustrative of the manner in which procedures applicable to the binder-free currently available glass plate chromatographic elements can be even more conveniently used with the binder containing chromatographic elements of the instant invention is the use of silver nitrate with such elements. Silver nitrate forms weak complexes with olefinic groups and, when incorporated into the adsorbent layer, serves to differentiate these materials. In order to use such complexing agents with the binder-free elements, the silver nitrate is added to the slurry of adsorbent prior to coating. This not only causes metallic silver to be deposited on the hands of the operator, but usually renders the already powdery adsorbent coating even more fragile. However, the binder containing elements of the instant invention need only be dipped into an alcoholic silver nitrate solution and dried prior to use. Incorporation of the silver nitrate in this manner in no way affects the physical nature of the coating.

While it is not a necessary procedure, the chromatographic elements of the instant invention can be activated in a known manner by heating before use. The elements of the instant invention respond to such activation in a manner substantially the same as that of the binder-free thin-layer chromatographic elements in that each will show substantially the same differences in performance after being activated for about one hour at 110° C. This further illustrates the parallelism and the desirable chromatographic properties of the instant invention relative to the binder-free glass plates despite the improved and desirable physical properties resulting from the inclusion of a binder in a chromatographic element according to the instant invention.

The polymeric binder must be insoluble in the elutant solvent used for chromatographic development. The binder does not completely cover or saturate the adsorption surface. Also, the binder must provide adhesion between the adsorbent and the inert support. It is possible to provide a sublayer on the support which will enhance adhesion of the binder, but this, while operable, is less desirable since yet another component is introduced which may adversely affect the chromatographic separations.

Three general types of polymeric binders are most useful in the conventional organic development solvents. These are: Hydrophilic polymers which include poly (vinyl alcohol), gelatin-poly (vinyl alcohol) mixtures and gelatin derivatives; cellulose derivatives such as carboxymethylhydroxyethyl cellulose; thermosetting polymers which include melamine-formaldehyde resins, poly (vinyl formal) resins, poly (vinyl acetal) resins, poly (vinyl butyral) resins, urea-formaldehyde resins, polyisocyanate resins, poly (hydroxy ether) resins, epoxy resins, and other cross-linking resins and mixtures thereof; and olefin polymers which include polyethylene and polypropylene both in emulsion and non-emulsion form.

The more desired range of polymeric binder in the coated adsorbent layer is from 4.5 to 65 percent by weight of such layer. Less than about 4.5 percent binder does not appreciably improve the cohesion of the thin layer and adhesion thereof to the support over that of the binder-free glass plates elements.

A particularly useful binder, and the preferred embodiment for use with organic elutants, is poly (vinyl alcohol). Up to 16 percent by weight of poly (vinyl alcohol) can be included in an adsorbent layer without incurring any adverse affect upon the native adsorptivity of an adsorbent such as silica gel. Layers containing larger amounts of binder display somewhat slower development but otherwise provide entirely satisfactory and complete separations compared to those of the preferred amounts.

Any of the conventional coating methods and apparatus can be used to coat the adsorbent-binder mixture onto the support. Doctor blades, air knives, roll coating and hopper coating are illustrative examples of such coating means.

A test which clearly demonstrates the improvement of this invention is one which, for purposes of this disclosure, will be designated as the "Camel's Hair Brush Test." The "Camel's Hair Brush Test" consists simply of brushing a chromatographic element with a Camel's hair brush for 50 strokes. A conventional glass plate thin-layer chromatographic element undergoes complete removal of the material with less than 50 strokes of the brush, and usually with but one or two strokes, while a thin-layer chromatographic element produced according to the instant invention undergoes no visible loss of material from the adsorbent layer with 50 strokes.

The invention can be readily understood with reference to the drawings wherein:

FIG. 1 shows an article produced according to this invention wherein an adsorbent layer and binder are coated as a thin-layer 1 on an inert support 2, and FIG. 2 is a graph illustrating the rate of solvent migration for methanol in centimeters per minute for both the binder-containing element of the instant invention shown as a broken line, and for the binder-free element shown as a solid line.

The invention will be more clearly recognized by reference to the following examples which are set forth to illustrate the invention, but not to limit it.

*Example 1*

160 grams of silica gel (Anasil, Type S, available from Analytical Engineering Laboratories, Inc.), 245 milliliters of methyl iso-butyl ketone, 10 grams of poly (vinyl butyral) having an average molecular weight of 50,000 and containing 9–13 percent poly (vinyl alcohol) (Butvar B–76) and 3 milliliters of a resin composition comprising 43.8 percent urea, 41.2 percent formaldehyde and 15 percent butyl alcohol (Uformite F–240) were thoroughly dispersed in a blender. The dispersion was coated as a thin layer on a polyethylene terephthalate film and allowed to set into a coherent, adherent coating. The resulting product separated the components of the standard Desaga test mixture of red, yellow, and blue dyes. The test dye mixture is available from Brinkmann Instruments, Inc., and contains 0.01 percent by weight of 4-dimethylaminoazobenzene, indophenol, and Sudan Red G in a benzene solvent. A separation was accomplished utilizing chloroform as the development solvent. Development was complete in four minutes.

*Example 2*

130 grams of powdered Nylon 11 polyamide adsorbent (available from Brinkmann Instruments, Inc.), 260 milliliters of methyl iso-butyl ketone, 13 grams of Butvar B–76 and 7 milliliters of Uformite F–240 were thoroughly blended together and coated on a polyethylene terephthalate film. The coating firmly adhered to the film and resisted abrasion. After curing, the coated film separated the Desaga standard test dye mixture after a ten minute development with methanol.

*Example 3*

50 grams of normal unsubstituted cellulose adsorbent (Cellulose MN300), available from Brinkmann Instruments, Inc., 10 grams of polyvinyl alcohol (Elvanol 70–05, available from DuPont), and 300 milliliters of water were thoroughly mixed and coated on polyethylene terephthalate film. The coating was dried and a mixture of 2 dyes (red and blue food colors, available from R. T. French Co.) were separated with methanol as the development solvent in four minutes.

*Example 4*

90 grams of silica gel (Silica Gel H available from Brinkmann Instruments, Inc.), 5 grams polyvinyl alcohol (Elvanol 70–05 available from DuPont), and 235 milliliters of water were thoroughly mixed and coated on polyethylene terephthalate film. The coating was dried and a standard (Desaga) test dye mixture was separated in four minutes using chloroform as the development solvent.

*Example 5*

57 grams of silica gel (Silica Gel H available from Brinkmann Instruments, Inc.), 11.4 grams of polyvinyl alcohol (Elvanol 70–05 from DuPont), 2.5 milliliters of n-butanol, and 165 grams of distilled water were thoroughly mixed and coated on polyethylene terephthalate film. The coating was dried and a standard (Desaga) test dye mixture was separated in four minutes using chloroform as the developing solvent.

*Example 6*

57 grams of silica gel (Silica Gel H available from

Brinkmann Instruments, Inc.), 19 grams of polyvinyl alcohol (Elvanol 70–50 available from DuPont), 2.5 milliliters of n-butanol, and 165 grams of water were thoroughly mixed and coated on polyethylene terephthalate film. The coating was dried and a standard Desaga test dye mixture was separated in four minutes using chloroform as the developing solvent. Separation after four minutes development was not as good as that of Examples 4 and 5, but similar results were approached after longer development. The separation was satisfactory though not superior.

*Example 7*

100 grams of aluminum oxide (Alumina AG7 available from Bio-Rad Laboratories), 5 grams of polyvinyl alcohol and 110 grams of water were thoroughly mixed together and coated onto a polyethylene terephthalate support in the manner set forth in Example 4. The thus formed chromatographic element separated the standard dye mixture using a toluene development solution in four minutes.

*Example 8*

23 grams of silica gel, 0.75 gram of polyvinyl alcohol and 29 grams of water were thoroughly mixed together and coated onto a polyethylene terephthalate support in the manner set forth in Example 4. The resulting chromatographic element displayed chromatographic activity substantially equal to that of the element in Example 4 but appeared powdery and adhered poorly to the support.

*Example 9*

The chromatographic elements produced discussed in Examples 1, 2, 3, 4, 5, 6, 7 and 8 were each brushed with 50 strokes of a Camel's hair brush in the manner described above as the "Camel's Hair Brush Test." The elements of Examples 1, 2, 3, 4, 5, 6 and 7 displayed no observable change in the coating. However, the element of Example 8 underwent substantial removal of the coating from the support.

From the above description and examples, it is clear that the instant invention bestows a heretofore unobtainable usefulness upon the art and science of chromatography. The chromatographic sheets of the instant invention can be precoated to exacting and reproducible standards under mass production conditions. Thereafter, the sheets can be readily stored or transported without elaborate precautions or fear of damage. When using chromatographic sheets prepared according to the instant invention, those in the art will have the benefit of substantially all of the advantages of the currently available glass plate binder-free thin-layer chromatographic elements wherein the adsorbent is merely deposited on a glass plate support without a binder, while avoiding the serious disadvantages of such a binder-free chromatographic element. The thin-layer sheets of the instant invention display chromatographic activity substantially equal to that of the binder-free elements without the fragile "powdering" of the binder-free glass plates which effectively preclude precoating of such glass plates. Instead of preparing an adsorbent mixture, hand coating the adsorbent mixture onto a bulky glass plate and drying the thus coated plate to render it useful, those practicing chromatography need only obtain a precoated thin-layer element according to the instant invention and proceed with the desired determination or separation.

We claim:

1. A thin-layer chromatographic element comprising a chromatographically-active layer adhered to a flexible inert support; said layer consisting essentially of a chromatographically-active adsorbent selected from the group consisting of alumina, silica gel, kieselguhr, polyamide powder, and cellulose powder, and a polymeric binder in a proportion of from about 4.5 to about 65 percent by weight of said layer; and said polymeric binder being selected from the group consisting of poly(vinyl alcohol), gelatin-poly (vinyl alcohol) mixtures, gelatin derivatives, cellulose derivatives, melamine-formaldehyde resins, poly (vinyl formal) resins, poly (vinyl acetal) resins, poly (vinyl butyral) resins, urea-formaldehyde resins, polyisocyanate resins, poly (hydroxy ether) resins, epoxy resins and olefin polymers.

2. A thin-layer chromatographic element as described in claim 1 wherein said flexible inert support is selected from the group consisting of polyester films, vinyl films, polyolefin films, cellulose films, polyamide films and metal foils.

3. A thin-layer chromatographic element as described in claim 1 wherein said flexible inert support is a polyester film.

4. A thin-layer chromatographic element as described in claim 1 wherein said flexible inert support is composed of polyethylene terephthalate.

5. A thin-layer chromatographic element as described in claim 1 wherein said chromatographically-active adsorbent is alumina.

6. A thin-layer chromatographic element as described in claim 1 wherein said chromatographically-active adsorbent is silica gel.

7. A thin-layer chromatographic element as described in claim 1 wherein said polymeric binder is a mixture of poly (vinyl butyral) resin and urea-formaldehyde resin.

8. A thin-layer chromatographic element as described in claim 1 wherein said polymeric binder is poly (vinyl alcohol).

9. A thin-layer chromatographic element as described in claim 8 wherein said poly (vinyl alcohol) is present in a proportion of from about 4.5 to about 16 percent by weight of said layer.

10. A thin-layer chromatographic element as described in claim 1 wherein said chromatographically-active adsorbent is alumina and said polymeric binder is poly (vinyl alcohol).

11. A thin-layer chromatographic element as described in claim 1 wherein said chromatographically-active adsorbent is silica gel and said polymeric binder is poly (vinyl alcohol).

12. A thin-layer chromatographic element as described in claim 1 wherein said flexible inert support is composed of polyethylene terephthalate said chromatographically-active adsorbent is alumina, and said polymeric binder is poly (vinyl alcohol).

13. A thin-layer chromatographic element as described in claim 1 wherein said flexible inert support is composed of polyethylene terephthalate, said chromatographically-active adsorbent is silica gel, and said polymeric binder is poly (vinyl alcohol).

References Cited

UNITED STATES PATENTS

| 2,759,847 | 8/1956 | Frost et al. | 117—16 |
|---|---|---|---|
| 2,822,272 | 2/1958 | Kosalek et al. | 96—91 |
| 2,999,016 | 9/1961 | Beeber et al. | 96—75 |
| 3,161,519 | 12/1964 | Alsup | 117—138.8 X |
| 3,303,043 | 2/1967 | Halpaap et al. | 117—33.5 |

WILLIAM D. MARTIN, *Primary Examiner.*

R. HUSAK, *Assistant Examiner.*

U.S. Cl. X.R.

117—124, 135.1, 138.8, 141, 144, 145, 161, 164, 166; 210—31